United States Patent
Zhu

(10) Patent No.: US 12,328,757 B2
(45) Date of Patent: Jun. 10, 2025

(54) COMMUNICATION METHOD AND APPARATUS BASED ON UNLICENSED SPECTRUM, AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 728 days.

(21) Appl. No.: 17/613,857

(22) PCT Filed: May 24, 2019

(86) PCT No.: PCT/CN2019/088323
§ 371 (c)(1),
(2) Date: Nov. 23, 2021

(87) PCT Pub. No.: WO2020/237424
PCT Pub. Date: Dec. 3, 2020

(65) Prior Publication Data
US 2022/0232630 A1    Jul. 21, 2022

(51) Int. Cl.
*H04W 74/0808* (2024.01)
*H04L 1/00* (2006.01)
*H04W 74/00* (2009.01)

(52) U.S. Cl.
CPC ....... *H04W 74/0808* (2013.01); *H04L 1/0061* (2013.01); *H04W 74/006* (2013.01)

(58) Field of Classification Search
None
See application file for complete search history.

(56) References Cited

U.S. PATENT DOCUMENTS

| | | | | |
|---|---|---|---|---|
| 10,701,722 B2 * | 6/2020 | Kim | ...................... | H04L 1/1822 |
| 11,095,403 B2 * | 8/2021 | Dinan | ................... | H04L 1/0026 |
| 11,116,008 B2 * | 9/2021 | Oh | ......................... | H04L 1/1614 |
| 11,184,776 B2 * | 11/2021 | Park | ...................... | H04W 16/14 |

(Continued)

FOREIGN PATENT DOCUMENTS

| | | |
|---|---|---|
| CN | 104333873 A | 2/2015 |
| CN | 104486013 A | 4/2015 |

(Continued)

OTHER PUBLICATIONS

First Indian Office Action issued in Indian Application No. 202127057579 dated Aug. 12, 2022 with partial English translation, (6p).

(Continued)

*Primary Examiner* — Faiyazkhan Ghafoerkhan
(74) *Attorney, Agent, or Firm* — Arch & Lake LLP

(57) ABSTRACT

The present disclosure provides a communication method and apparatus based on an unlicensed spectrum, and a storage medium. The method comprises: an access network device acquires a channel state detection result of an unlicensed spectrum, the channel state detection result comprising whether a sub-band or a bandwidth part in the unlicensed spectrum is busy; and the access network device sends downlink control information to a terminal, the downlink control information indicating whether at least part of sub-bands or bandwidth parts in the channel state detection result are busy.

18 Claims, 5 Drawing Sheets

(56) References Cited

U.S. PATENT DOCUMENTS

| | | | | |
|---|---|---|---|---|
| 11,184,887 B2* | 11/2021 | Liu | | H04L 5/0094 |
| 11,297,674 B2* | 4/2022 | He | | H04L 5/0048 |
| 11,445,542 B2* | 9/2022 | Park | | H04W 74/004 |
| 11,516,792 B2* | 11/2022 | Dinan | | H04W 72/0453 |
| 11,523,379 B2* | 12/2022 | Dinan | | H04L 5/00 |
| 11,575,473 B2* | 2/2023 | Kusashima | | H04L 1/1819 |
| 11,706,633 B2* | 7/2023 | Park | | H04L 1/1614 370/329 |
| 11,778,633 B2* | 10/2023 | Liu | | H04W 24/10 370/329 |
| 11,812,468 B2* | 11/2023 | Oh | | H04L 5/0094 |
| 11,855,782 B2* | 12/2023 | Wang | | H04W 72/1268 |
| 11,917,683 B2* | 2/2024 | Jung | | H04W 74/006 |
| 11,979,905 B2* | 5/2024 | Zhang | | H04L 5/0098 |
| 2015/0365152 A1* | 12/2015 | Frenne | | H04B 7/0626 370/252 |
| 2016/0345206 A1* | 11/2016 | Yerramalli | | H04W 74/006 |
| 2016/0381589 A1* | 12/2016 | Zhang | | H04W 24/10 370/252 |
| 2017/0078994 A1* | 3/2017 | Dinan | | H04W 56/0005 |
| 2017/0078995 A1* | 3/2017 | Dinan | | H04W 16/14 |
| 2017/0078997 A1* | 3/2017 | Dinan | | H04W 16/14 |
| 2017/0086172 A1* | 3/2017 | Dinan | | H04L 5/0091 |
| 2017/0171759 A1* | 6/2017 | Li | | H04L 27/0006 |
| 2017/0238311 A1* | 8/2017 | Hooli | | H04W 72/23 370/329 |
| 2017/0280476 A1* | 9/2017 | Yerramalli | | H04W 72/1268 |
| 2017/0318607 A1* | 11/2017 | Tiirola | | H04W 4/10 |
| 2018/0092101 A1* | 3/2018 | Xia | | H04W 72/23 |
| 2018/0352573 A1* | 12/2018 | Yang | | H04W 16/14 |
| 2019/0254110 A1* | 8/2019 | He | | H04L 41/0896 |
| 2019/0268939 A1* | 8/2019 | Yang | | H04W 72/20 |
| 2019/0327719 A1* | 10/2019 | Liu | | H04B 7/0619 |
| 2019/0349968 A1* | 11/2019 | Yerramalli | | H04W 16/14 |
| 2020/0021999 A1* | 1/2020 | Park | | H04W 74/0808 |
| 2020/0053797 A1* | 2/2020 | Basu Mallick | | H04W 74/0833 |
| 2020/0146064 A1* | 5/2020 | Oh | | H04W 74/0808 |
| 2020/0274658 A1* | 8/2020 | Dinan | | H04L 5/001 |
| 2020/0337036 A1* | 10/2020 | Dinan | | H04L 5/0053 |
| 2020/0337037 A1* | 10/2020 | Dinan | | H04W 72/23 |
| 2021/0144739 A1* | 5/2021 | Jiang | | H04L 27/2613 |
| 2021/0176028 A1* | 6/2021 | Zhou | | H04W 72/23 |
| 2021/0235487 A1* | 7/2021 | Park | | H04L 1/0068 |
| 2021/0274549 A1* | 9/2021 | Park | | H04W 74/002 |
| 2021/0315006 A1* | 10/2021 | Zhang | | H04L 5/0098 |
| 2021/0329676 A1* | 10/2021 | Yang | | H04W 4/46 |
| 2021/0400719 A1* | 12/2021 | Oh | | H04L 1/1614 |
| 2022/0038916 A1* | 2/2022 | Park | | H04L 1/1614 |
| 2022/0039158 A1* | 2/2022 | Awadin | | H04W 74/0866 |
| 2022/0053536 A1* | 2/2022 | Lei | | H04L 1/1614 |
| 2022/0061038 A1* | 2/2022 | Liu | | H04W 72/046 |
| 2022/0061094 A1* | 2/2022 | Jung | | H04W 74/0816 |
| 2022/0124698 A1* | 4/2022 | Noh | | H04W 72/51 |
| 2022/0210866 A1* | 6/2022 | He | | H04W 76/28 |
| 2022/0232630 A1* | 7/2022 | Zhu | | H04W 74/006 |
| 2023/0040898 A1* | 2/2023 | Dinan | | H04L 5/00 |
| 2024/0196437 A1* | 6/2024 | Awadin | | H04W 72/23 |

FOREIGN PATENT DOCUMENTS

| | | |
|---|---|---|
| CN | 107734560 A | 2/2018 |
| CN | 109699078 A | 4/2019 |
| KR | 101913051 B1 | 10/2018 |
| WO | 2016119302 A1 | 8/2016 |
| WO | 2017050126 A1 | 3/2017 |
| WO | 2018072197 A1 | 4/2018 |
| WO | 2020091561 A1 | 5/2020 |

OTHER PUBLICATIONS

Extended European Search Report of EP Application No. 19930644.0 dated May 16, 2022, (12p).

ITRI, "DL control information to facilitate wideband operation in NR-U", 3GPP TSG RAN WG1 Ad-Hoc Meeting 1902, R1-1900987, Taipei, Taiwan Jan. 21-25, 2019, (3p).

LG Electronics, "Wide-band operation for NR-U", 3GPP TSG RAN WG1 #97, Reno, Nevada, May 13-17, 2019, (7p).

International Search Report of PCT/CN2019/088323 dated Feb. 26, 2020 with English translation, (4p).

Huawei et al., "Miscellaneous Correction to FeLAA in TS 36.300", 3GPP TSG-RAN WG2 Meeting #103, R2-1813347, Gothenburg, Sweden, Aug. 24, 2018, (7p).

Hearing Notice issued in IN application No. 202127057579 dated Apr. 8, 2024, (2p).

* cited by examiner

COMMUNICATION METHOD AND APPARATUS BASED ON UNLICENSED SPECTRUM, AND STORAGE MEDIUM

CROSS REFERENCE TO RELATED APPLICATION

The present application is the U.S. national phase application of PCT International Application No. PCT/CN2019/088323 filed on May 24, 2019, the entire content of which is incorporated herein for all purposes.

TECHNICAL FIELD

The present disclosure relates to the field of communication technology, and in particular to a communication method and apparatus based on an unlicensed spectrum, and a storage medium.

BACKGROUND

With the continuously higher requirements of various services for data transmission, only relying on authorized spectrum can no longer meet business needs. Thus, resource-rich unlicensed spectrum has become the target of enterprise exploration. In order to ensure the fair coexistence between different wireless access technologies of the unlicensed spectrum, it is proposed to use the unlicensed spectrum through the License Assisted Access (LAA) mechanism.

In LAA, the Listen before Talk (LBT) technology based on idle channel state detection is introduced, wherein the sender needs to detect whether the channel is idle before sending data, and data can only be sent when the channel is in the idle state so as to avoid conflicts.

SUMMARY

According to an aspect of the present disclosure, there is provided a communication method based on an unlicensed spectrum. The method comprises: acquiring a channel state detection result of the unlicensed spectrum, wherein the channel state detection result comprises whether subbands or bandwidth parts in the unlicensed spectrum are busy, and each bandwidth part comprises one or more subbands; and sending downlink control information, wherein the downlink control information indicates at least one subband in the channel state detection result is busy or not, or indicates at least one bandwidth part in the channel state detection result is busy or not.

According to another aspect of the present disclosure, there is provided a communication method based on an unlicensed spectrum. The method comprises: receiving downlink control information, wherein the downlink control information indicates at least one subband in the channel state detection result is busy or not, or indicates at least one bandwidth part in the channel state detection result is busy or not, and each bandwidth part includes one or more subbands; and performing at least one of detection of control signaling and receiving of data on a first subband, wherein the first subband is an idle subband or a subband in an idle bandwidth part in the unlicensed spectrum.

According to another aspect of the present disclosure, there is provided an access network device. The access network device comprises: a processor; and a memory for storing processor executable instructions, wherein the processor is configured to load and execute the executable instructions to implement a communication method based on an unlicensed spectrum as described in the first aspect.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show examples in accordance with the present disclosure, and are used together with the specification to explain the principle of the present disclosure.

DETAILED DESCRIPTION OF THE EMBODIMENTS

Figure 1:
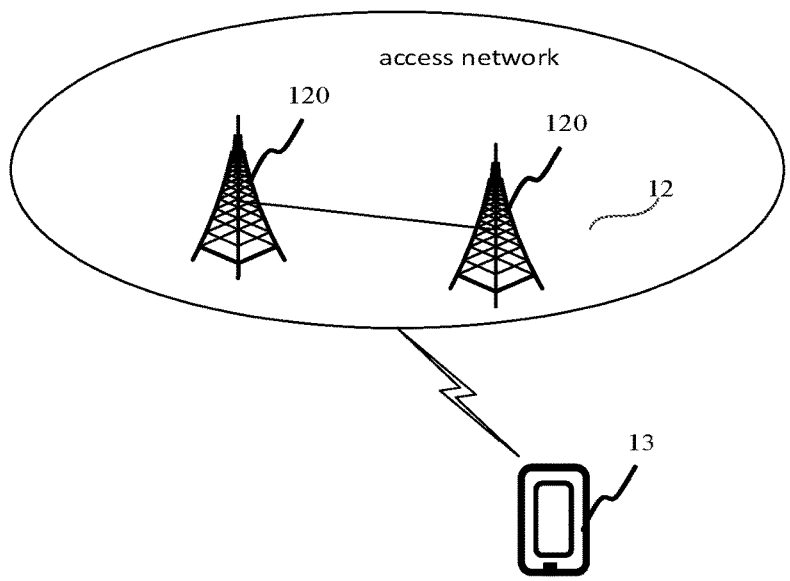
FIG. 1 is a schematic diagram of a network architecture according to one or more examples of the present disclosure.

The exemplary embodiments will be described in detail herein, and examples thereof are shown in the accompanying drawings. When the following description refers to the drawings, unless otherwise indicated, the same numbers in different drawings indicate the same or similar elements. The implementations described in the following exemplary embodiments do not represent all the implementations consistent with the present disclosure. Rather, they are merely examples of devices and methods consistent with some aspects of the present disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 shows a block diagram of a communication system provided by an example of the present disclosure. As shown in FIG. 1, the communication system may include an access network 12 and a terminal 13.

The access network 12 includes several access network devices 120. The access network device 120 may be a base station, which is a device deployed in an access network to provide a wireless communication function for a terminal. The base station may include various forms of macro base stations, micro base stations, relay stations, access points, and so on. In systems using different wireless access technologies, the names of devices with base station functions may be different. For example, in LTE systems, they are called eNodeB or eNB. In 5G New Radio (NR) systems, they are called gNodeB or gNB. With the evolution of communication technology, the name of "base station" may be changed in description. For the convenience of description, the above-mentioned devices that provide wireless communication functions for terminals are collectively referred to as access network device hereinafter.

The terminal 13 may include various handheld devices with wireless communication functions, vehicle-mounted devices, wearable devices, computing devices, or other processing devices connected to wireless modems, as well as various forms of user equipment (UE), mobile stations (MS), terminal device, and so on. For the ease of description, the devices mentioned above are collectively referred to as terminals. The access network device 120 and the terminal 13 communicate with each other through a certain air interface technology, such as a Uu interface.

In the new generation communication system (such as 5G), the maximum bandwidth of a carrier can reach 100 MHz. In this case, when the terminal performs downlink control signaling detection or data reception, it needs to perform control signaling detection or data reception on the entire carrier. Since the bandwidth of a carrier is as high as 100 MHz, the terminal needs to detect a large bandwidth and consume a large amount of power during control signaling detection or data reception.

The communication system and service scenarios described in examples of the present disclosure are intended to more clearly illustrate the technical solutions of examples of the present disclosure, and do not constitute any limitation to the technical solutions provided by examples of the present disclosure. Those of ordinary skill in the art will know that with the evolution of the communication system and the emergence of new service scenarios, the technical solutions provided in examples of the present disclosure are equally applicable to similar technical problems.

Figure 2:
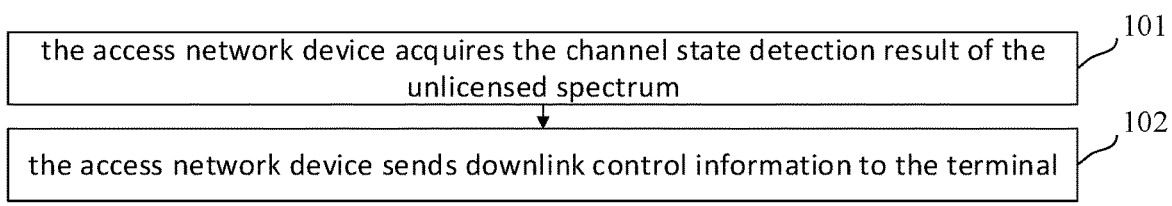
FIG. 2 is a flow chart showing a communication method based on an unlicensed spectrum according to one or more examples of the present disclosure.

FIG. 2 is a flowchart showing a communication method based on an unlicensed spectrum according to an example. Referring to FIG. 2, the method includes the following steps.

In step 101, the access network device acquires the channel state detection result of the unlicensed spectrum, wherein the channel state detection result includes whether the subbands or bandwidth parts of the unlicensed spectrum are busy.

Here, each bandwidth part includes one or more subbands. When each of the bandwidth parts includes one subband, the division of the bandwidth part and the subband are exactly the same. When there is at least one bandwidth part that contains more than one subband, the division of the bandwidth part is different from the subband. The bandwidth of each bandwidth part is an integer multiple of the subband.

When the access network device detects whether the channel is busy, it can be divided into detecting multiple subbands separately. In addition, when the access network device detects whether the channel is busy, it can detect whether all the subbands on a carrier are busy, or only detect whether some subbands on a carrier are busy. For example, if a carrier includes 5 subbands, then the access network device can respectively detect whether the frequency resources corresponding to these five subbands are busy, or the access network device can detect whether the frequency resources corresponding to one or more of the five subbands are busy. After detecting whether each subband is busy, it can be determined whether each bandwidth part is busy.

The subband herein is also the channel state detection subband, and can also be called the LBT subband. The frequency bandwidth corresponding to each subband is the same. For example, a carrier has a bandwidth of 80 MHz, which includes four channel state detection subbands of 20 MHz, and the access network device can perform channel state detection on these four channel state detection subbands respectively.

In an example of the present disclosure, whether the subband is busy or not indicates the channel state of the subband. A busy subband means that the frequency resource corresponding to the subband is occupied by other communication systems (or some devices in the current communication system), and the other communication systems are transmitting data on the frequency resources corresponding to the subband. Therefore, such subband cannot be used for data transmission between the access network device and the terminal, and the subband is in a non-idle state. An idle subband means that the frequency resource corresponding to the subband is not occupied by any communication system, and can thus be used for data transmission between the access network device and the terminal. That is, the subband is in an idle state. Whether the bandwidth is busy or not is the same as the aforementioned subband situation, which will not be repeated here.

In step 102, the access network device sends downlink control information to the terminal, wherein the downlink control information is used to indicate whether at least part of the subbands or bandwidth parts in the channel state detection result is busy.

In an example of the present disclosure, when the access network device indicates the channel state detection result to the terminal, it can indicate all the channel state detection results to the terminal. That is, it is indicated to the terminal whether all the subbands or bandwidth parts in the channel state detection result are busy. Alternatively, part of the channel state detection result can be indicated to the terminal. That is, it is indicated to the terminal whether part of the subbands or the bandwidth parts in the channel state detection result is busy.

In an example of the present disclosure, the access network device and the terminal have established a connection on an authorized spectrum before step 102. Therefore, after the access network device completes channel state detection on the unlicensed spectrum, it can use the connection on the authorized spectrum to send information to the terminal, for example, sending downlink control information (DCI). The downlink control information is used to indicate the channel state detection result of the access network device on the unlicensed spectrum.

Alternatively, before step 102, the access network device and the terminal can send information to the terminal through the connection on the unlicensed spectrum after the access network device completes channel state detection on the unlicensed spectrum, for example, sending downlink control information. The downlink control information indicates the channel state detection result of the access network device on the unlicensed spectrum.

Exemplarily, the downlink control information may be physical layer signaling.

In an example of the present disclosure, the channel state detection result of one or more subbands on the unlicensed spectrum is acquired by the access network device. The channel state detection result is indicated to the terminal through the downlink control information. Thus, based on the channel state detection result, the terminal can perform the detection of control signaling and the reception of data on an idle subband, thereby saving power consumption of the terminal.

Optionally, the downlink control information carries first indication information. The first indication information is used to indicate the channel state of the subband or the bandwidth part, and the channel state of the subband or the bandwidth part includes being busy or idle.

In an implementation, the access network device indicates to the terminal whether the subband or bandwidth part is busy through the first indication information. In this way, the terminal can detect control signaling and receive data according to the idle subbands, so as to save power.

Optionally, the first indication information includes a bitmap. The bitmap is a data structure that stores data through a bit array. In the present application, the data stored in the bit array is about whether the subband or bandwidth part is busy. The subband or bandwidth part is mapped to each bit in the bitmap, and each bit uses 0 and 1 to indicate respectively that the subband or bandwidth part is busy or idle.

Each bit of the bitmap corresponds to a subband, and each bit of the bitmap is used to indicate the channel state of the respective subband. Alternatively, each bit of the bitmap corresponds to a bandwidth part, and each bit of the bitmap is respectively used to indicate the channel state of the respective bandwidth part.

In an implementation, a bitmap is used as a way to indicate whether a subband is busy, wherein each bit of the bitmap represents a subband or bandwidth part, and the terminal can determine whether the respective subband or bandwidth part is busy according to each bit.

Each bit of the bitmap may sequentially represent each subband or bandwidth part, and the frequency resource corresponding to each subband and each bandwidth part may be notified to the terminal in advance by the access network device.

Optionally, the first indication information includes a subband identifier, and the channel state of the subband corresponding to the subband identifier. Alternatively, the first indication information includes a bandwidth part identifier, and the channel state of the bandwidth part corresponding to the bandwidth part identifier.

In an implementation, the subband identifier and the channel state of the subband corresponding to the subband identifier, or the bandwidth part identifier and the channel state of the bandwidth part corresponding to the bandwidth part identifier, can be used to indicate to the terminal device whether each subband or bandwidth part is busy.

The correspondence between the subband identifier and the subband, or the correspondence between the bandwidth part identifier and the bandwidth part, may be notified to the terminal in advance by the access network device.

Optionally, the downlink control information carries second indication information. The second indication information is used to indicate the identifier of a first subband or a first bandwidth part, and the channel state of the first subband or the first bandwidth part is being idle. Alternatively, the second indication information is used to indicate the identifier of a second subband or a second bandwidth part, and the channel state of the second subband or the second bandwidth part is being busy.

In an implementation, the access network device indicates to the terminal the identifier of the subband or bandwidth part, and the channel states of the subbands or bandwidth parts represented by these identifiers as indicated are defined in advance. For example, all the channel states as indicated are idle. In this way, the terminal can determine the idle subbands based on these identifiers.

Optionally, the downlink control information carries third indication information. The third indication information is used to indicate a state set. The state set includes the channel state of one or more subbands, or the state set includes the channel state of one or more bandwidth parts. The channel state of each band or bandwidth part includes being busy or idle.

In an implementation, the access network device indicates a state set to the terminal through the third indication information. The terminal determines the state set according to the third indication information, and then determines the idle subband from the state set. Thus, the terminal can perform control signaling detection and data reception according to the idle subband so as to save power.

Here, the state set corresponds to a set of channel states of one or more subbands (or bandwidth parts).

Optionally, the third indication information includes an identifier of the state set, and there is a first correspondence between the identifier and the state set. Alternatively, the third indication information includes an orthogonality sequence, and there is a second correspondence between the orthogonality sequence and the state set. Further alternatively, the third indication information is the time domain transmission position or the frequency domain transmission position of the downlink control information, and there is a third correspondence between the time domain transmission position or the frequency domain transmission position of the downlink control information and the state set.

In an implementation, the state set is indicated to the terminal by carrying the identifier of the state set, so that the terminal can determine an idle subband or bandwidth part according to the state set. Alternatively, the access network device uses the orthogonality sequence in the communication process with the terminal to indicate the state set. Further alternatively, the access network device uses the transmission position of the downlink control information to indicate the state set. That is, implicit indication is used, without adding new fields, which saves the amount of data that needs to be transmitted and is easy to implement.

Optionally, the orthogonality sequence is a scrambling sequence used to scramble CRC of the downlink control signaling.

In an implementation, the CRC scrambling sequence is used to indicate to the terminal whether the subband or the bandwidth part is busy. That is, implicit indication is used, without adding new fields, which saves the amount of data that needs to be transmitted and is convenient to implement.

Optionally, the method further includes: sending, by the access network device, configuration signaling to the terminal, wherein the configuration signaling is used to configure the first correspondence, the second correspondence, or the third correspondence.

In an implementation, the access network device sends the identifier of the state set or the correspondence between the orthogonality sequence and the state set to the terminal in advance, so that the terminal can determine the idle subband or bandwidth part according to the third indication information sent by the access network device.

Optionally, the downlink control information is common downlink control information sent to multiple terminals. That is, the downlink control information is downlink control information used to transmit common information of multiple terminals. Alternatively, the downlink control information is the proprietary downlink control information sent to a single terminal. That is, the downlink control information is the downlink control information used to transmit the proprietary information of a single terminal. For example, the downlink control information is the configuration information of the bandwidth part configured for a single terminal. The bandwidth part includes one or more subbands.

In an implementation, the downlink control information can be downlink control information sent to multiple terminals. Alternatively, it can be downlink control information sent to a single terminal. That is, the access network device can simultaneously indicate the channel state detection result to multiple terminals. Also, the channel state detection result can be separately indicated to a single terminal to achieve flexibility.

Optionally, the multiple subbands are subbands on one or more carriers.

In an implementation, the access network device can indicate whether the subbands on one or more carriers are busy at the same time, so that the terminal can perform control signaling detection and data reception based on the idle subbands on one or more carriers at the same time.

It is worth noting that the foregoing steps 101-102 and the foregoing optional steps can be combined arbitrarily.

Figure 3:
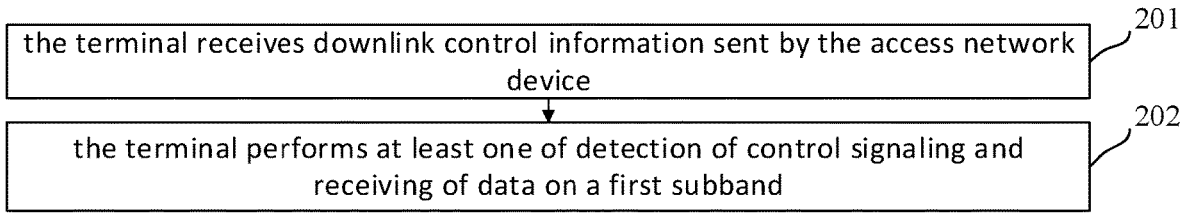
FIG. 3 is a flow chart showing a communication method based on an unlicensed spectrum according to one or more examples of the present disclosure.

FIG. 3 is a flow chart showing a communication method based on an unlicensed spectrum according to an example. Referring to FIG. 3, the method includes the following steps.

In step 201, the terminal receives downlink control information sent by the access network device. The downlink control information is used to indicate whether at least part of the subbands or the bandwidth parts in the channel state detection result is busy, wherein each bandwidth part includes one or more subbands.

In step 202, the terminal performs at least one of detection of control signaling and receiving of data on a first subband, wherein the first subband is an idle subband in the unlicensed spectrum.

After receiving the downlink control information sent by the access network device, the terminal can determine which subbands are idle. The terminal only needs to perform detection of control signaling and receiving of data on the subbands occupied successfully by the access network device (that is, the idle subbands indicated in the downlink control information).

In an example of the present disclosure, the access network device indicates the channel state detection result to the access network device through the downlink control information. After accessing the downlink control information, the terminal, according to the channel state detection result, performs detection of control signaling and the reception of data in the idle subband, thus realizing rapid detection of control signaling and reception of data, and saving the power consumption of the terminal.

Optionally, the downlink control information carries first indication information, and the first indication information is used to indicate the channel state of the subband or the bandwidth part, and the channel state of the subband or the bandwidth part includes being busy or idle.

Optionally, the first indication information includes a bitmap. Each bit of the bitmap corresponds to a subband, and each bit of the bitmap is used to indicate the channel state of the respective subband. Alternatively, each bit of the bitmap corresponds to a bandwidth part, and each bit of the bitmap is used to indicate the channel state of the respective bandwidth part.

Optionally, the first indication information includes: a subband identifier, and the channel state of the subband corresponding to the subband identifier. Alternatively, the first indication information includes: a bandwidth part identifier, and the channel state of the bandwidth part corresponding to the bandwidth part identifier.

Optionally, the downlink control information carries second indication information, and the second indication information is used to indicate the identifier of a first subband or a first bandwidth part, and the channel state of the first subband or the first bandwidth part is being idle. Alternatively, the second indication information is used to indicate the identifier of a second subband or a second bandwidth part, and the channel state of the second subband or the second bandwidth part is being busy.

Optionally, the downlink control information carries third indication information. The third indication information is used to indicate a state set. The state set includes the channel state of one or more subbands, or the state set includes the channel state of one or more bandwidth parts. The channel state of each subband or each bandwidth part includes being busy or idle. Alternatively, the third indication information is the time domain transmission position or the frequency domain transmission position of the downlink control information, and there is a third correspondence between the time domain transmission position or the frequency domain transmission position of the downlink control information and the state set.

Optionally, the third indication information includes an identifier of the state set, and there is a first correspondence between the identifier and the state set. Alternatively, the third indication information includes an orthogonality sequence, and there is a second correspondence between the orthogonality sequence and the state set.

Optionally, the method further includes: receiving configuration signaling, wherein the configuration signaling is used to configure the first correspondence, the second correspondence, or the third correspondence.

Optionally, the orthogonality sequence is a scrambling sequence used to scramble CRC of the downlink control signaling.

Optionally, the downlink control information is common downlink control information sent to multiple terminals, or the downlink control information is dedicated downlink control information sent to a single terminal.

Optionally, the multiple subbands are subbands on one or more carriers.

It is worth noting that the aforementioned steps 201-202 and the aforementioned optional steps can be combined arbitrarily.

Figure 4:
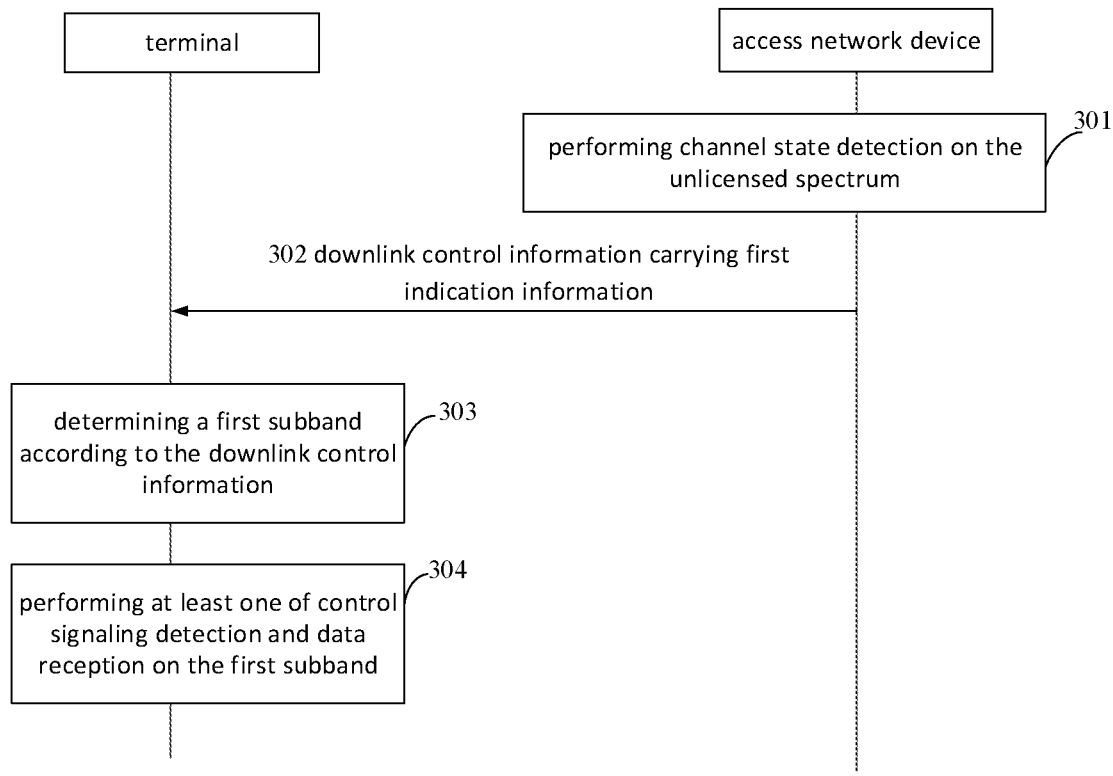
FIG. 4 is a flow chart showing a communication method based on an unlicensed spectrum according to one or more examples of the present disclosure.

FIG. 4 is a flowchart showing a communication method based on an unlicensed spectrum according to an example. Referring to FIG. 4, the method includes the following steps.

In step 301, the access network device performs channel state detection on the unlicensed spectrum.

The access network device acquires the channel state detection result of the unlicensed spectrum through the channel state detection process, wherein the channel state detection result includes whether the subbands or bandwidth parts of the unlicensed spectrum are busy.

In an example of the present disclosure, the access network device can detect whether the subbands on one or more carriers are busy. That is, when detecting multiple subbands, the multiple subbands are subbands on one or more carriers.

Further, the access network device can also detect whether all the subbands on a carrier are busy, and can also detect whether some subbands on a carrier are busy.

When the access network device performs channel state detection, it detects whether each subband is busy.

In step 302, the access network device sends downlink control information to the terminal. The downlink control information carries first indication information. The first indication information is used to indicate the channel state of the subband or bandwidth part. The channel state of the subband or bandwidth part includes being busy or idle. The bandwidth part includes one or more subbands.

Accordingly, the terminal receives the downlink control information sent by the access network device. Exemplarily, the terminal may receive the downlink control information sent by the access network device through a connection on an authorized spectrum. Alternatively, the terminal may also receive the downlink control information sent by the access network device through a connection on the unlicensed spectrum, so as to obtain the channel state detection result of the access network device on the unlicensed spectrum.

In an example of the present invention, the downlink control information is downlink control information configured for multiple terminals. Alternatively, the downlink control information is configuration information of a bandwidth part configured for a single terminal.

In an example of the present disclosure, in addition to indicating whether each subband is busy, the first indication information can also indicate whether each bandwidth part (BWP) is busy, thereby indicating whether each subband is busy.

Here, the bandwidth part refers to a part of continuous resources in frequency domain within a carrier. A carrier can be divided into multiple bandwidth parts in frequency domain, and each bandwidth part may include one or more subbands.

Figure 5A:
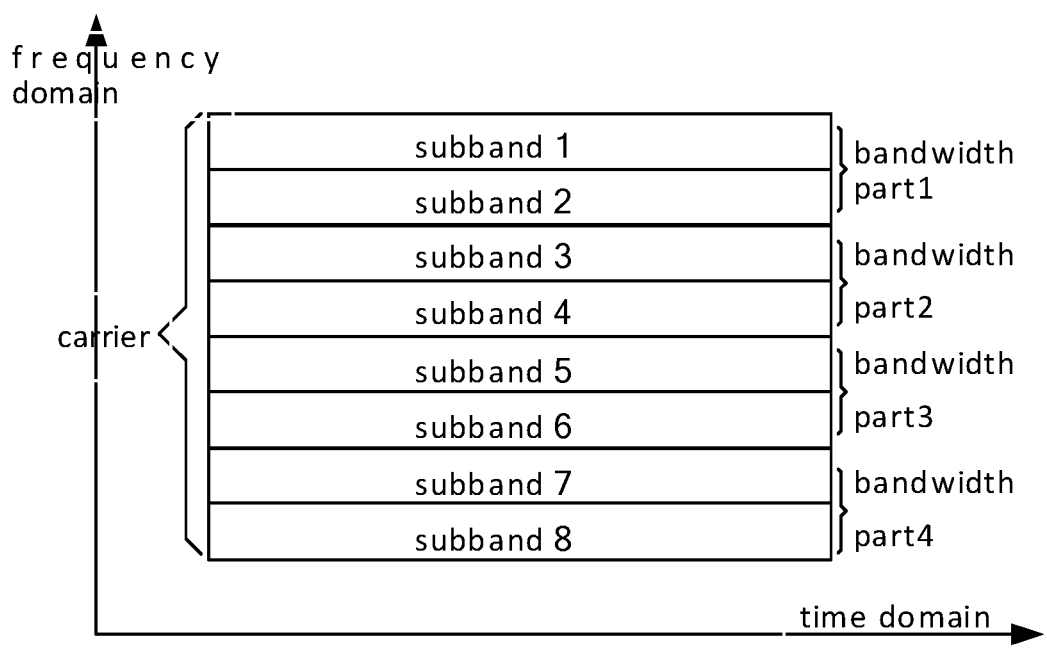
FIG. 5A is a schematic diagram showing a carrier wave according to one or more examples of the present disclosure.

FIG. 5A is a schematic diagram showing a carrier wave according to an example. Referring to FIG. 5A, a carrier with a bandwidth of 80 MHz can be divided into 4 bandwidth parts, and the bandwidth of each bandwidth part is 20 MHz. Each bandwidth part includes 2 subbands each having a bandwidth of 10 MHz.

In an example of the present disclosure, the first indication information can be implemented in the following two ways.

As a first type, the first indication information includes a bitmap. Each bit of the bitmap corresponds to a subband, and each bit of the bitmap is used to indicate the channel state of the respective subband. Alternatively, each bit of the bitmap corresponds to a bandwidth part, and each bit of the bitmap is used to indicate the channel state of the respective bandwidth part.

Each bit of the bitmap may sequentially represent an individual subband or bandwidth part, and the frequency resource corresponding to each subband and each bandwidth part may be notified to the terminal in advance by the access network device.

Figure 5B:
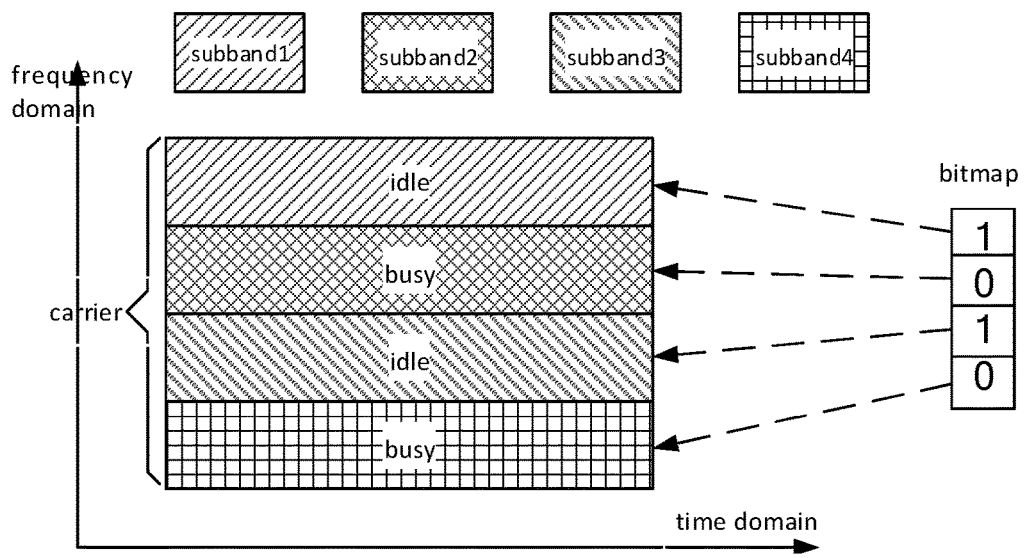
FIG. 5B shows the structure of a bitmap according to one or more examples of the present disclosure.

FIG. 5B shows the structure of a bitmap according to an example. Referring to FIG. 5B, a carrier includes 4 subbands. The channel states of these four subbands are being idle, busy, idle, and busy respectively. The corresponding bitmap includes 4 bits. The values of these 4 bits are 1010, wherein 1 means being idle, and 0 indicates being busy.

In an example of the present disclosure, the multiple subbands indicated by the first indication information may be subbands on one or more carriers. For example, if one carrier includes 4 subbands and another carrier includes 5 subbands, the bitmap in the aforementioned first indication information may have 9 bits, which are respectively used to indicate whether these 9 subbands are busy.

It only needs to indicate whether each subband or each bandwidth part is busy in the bitmap. As for the correspondence between each bit on the bitmap and the subband or bandwidth part, it can be sent by the access network device to the terminal, or configured in the access network device and the terminal. For example, the access network device sends the frequency band range of the subband mapped by each bit in the bitmap to the terminal.

As a second type, the first indication information includes a subband identifier, and the channel state of the subband corresponding to the subband identifier. Alternatively, the first indication information includes a bandwidth part identifier, and the channel state of the bandwidth part corresponding to the bandwidth part identifier.

The channel state of the subband (or bandwidth part) can be represented by bit 0 or 1, wherein 0 means being busy, and 1 means being idle. The identifier of the subband (or bandwidth part) can be indicated by setting the corresponding identification bit according to the number of subbands (or bandwidth parts). For example, when the access network device needs to indicate that the number of subbands of the terminal is less than or equal to 4, the identifiers of the subbands (or bandwidth parts) can be 2 bits. For example, if the number of subbands is 4, they can be 00, 01, 10, 11, etc.

respectively. When the number is greater than 4 and less than or equal to 8, the identifiers of the subbands (or bandwidth parts) can be 3 bits, and so on. In the first indication information, the following bit of the subband (or bandwidth part) identifier is used as the channel state of the subband (or bandwidth part), which is used to indicate whether the subband (or bandwidth part) corresponding to the subband (or bandwidth part) identifier is busy. For example, 001 indicates that the subband whose subband identifier is 00 is idle.

The correspondence between the subband identifier and the subband, or the correspondence between the bandwidth part identifier and the bandwidth part may be notified to the terminal in advance by the access network device.

In an example of the present disclosure, the downlink control information may carry one or more first indication information at the same time.

In step 303, the terminal determines a first subband according to the downlink control information, wherein the first subband is an idle subband in the unlicensed spectrum.

The terminal determines one or more idle subbands (that is, the first subband), according to the first indication information in the downlink control information.

Exemplarily, when the first indication information includes a bitmap, the terminal determines, according to the value of each bit in the bitmap, a subband or bandwidth part corresponding to a bit with a value of 0. When a bandwidth part is determined, the subbands included in each idle bandwidth part are further determined, so as to obtain the idle subbands. The correspondence between the bandwidth part and the subband can be set in the terminal and the access network device in advance, or can be notified to the terminal by the access network device.

Exemplarily, when the first indication information includes the subband identifier and the channel state of the subband corresponding to the subband identifier, the terminal determines, based on the number of bits occupied by the subband (or bandwidth part) identifier and the first indication information, the idle subbands. For example, the number of bits occupied by the subband (or bandwidth part) identifier is 2 bits, and the next bit of each subband (or bandwidth part) identifier represents the channel state of the subband. For example, bit 0 means being busy, and bit 1 means being idle. If the first indication information includes 001011100111, it can be determined that the subband identified as 00 is idle, the subband identified as 01 is idle, the subband identified as 10 is busy, and the subband identified as 11 is idle.

Further, the access network device can also configure and combine multiple subbands (or bandwidth parts) on a carrier, and allocate different configuration combinations to different terminals. The access network device can combine one or more subbands (or bandwidth parts) to a terminal. For example, the access network device sends the configuration information of the subband (or bandwidth part) to the terminal, thereby notifying the terminal of the subband (or bandwidth part) configured for the terminal. Exemplarily, the configuration information may be bandwidth part configuration information, which may include the frequency range, parameter set (numerology), frequency point, etc. of the bandwidth part.

When the terminal determines the first subband, it only confirms on the subbands or bandwidth parts configured by the access network device for the terminal, so as to obtain the idle subband in the subbands configured for the terminal. The detection of control signaling and the receiving of data are performed on the idle subband in the subbands configured for the terminal.

In step 304, the terminal performs at least one of control signaling detection and data reception on the first subband.

After determining the idle subband in step 303, the terminal may perform at least one of control signaling detection and data reception on the idle subband.

Here, the control signaling refers to the control signaling issued by the access network device. The terminal detects the control signaling issued by the access network device on the idle subband. The data reception refers to reception of the downlink data transmitted by the access network device on the idle subband.

Figure 6:
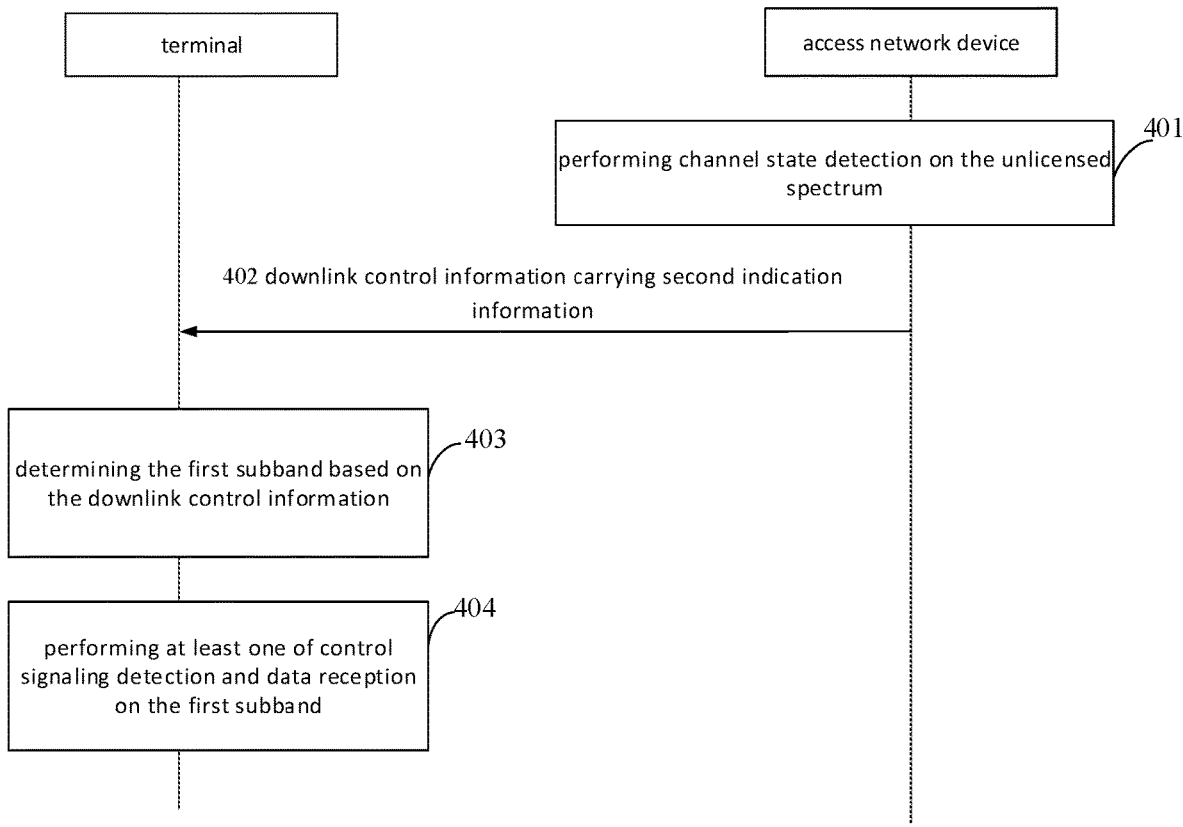
FIG. 6 is a flow chart showing a communication method based on an unlicensed spectrum according to one or more examples of the present disclosure.

FIG. 6 is a flowchart showing a communication method based on an unlicensed spectrum according to an example. Referring to FIG. 6, the method includes the following steps.

In step 401, the access network device performs channel state detection on the unlicensed spectrum.

This step is the same as step 301, and step 301 can be referred to for the detailed process.

In step 402, the access network device sends downlink control information to the terminal. The second indication information is used to indicate the identifier of a first subband or a first bandwidth part, and the channel state of the first subband or the first bandwidth part is being idle. Alternatively, the second indication information is used to indicate the identifier of a second subband or a second bandwidth part, and the channel state of the second subband or the second bandwidth part is being busy. Each bandwidth part includes one or more subbands.

In an example of the present disclosure, the main difference between step 402 and step 302 is that the downlink control information in step 402 carries second indication information, which indirectly indicates the channel state of each subband or bandwidth part. For example, the second indication information only indicates the identifiers of busy or idle subbands (or bandwidth parts). Thus, there is no need to indicate the channel state of each subband, thereby saving data overhead.

For example, the second indication information includes 13456, and the second indication information indicates that the subband numbered 13456 is idle. It is agreed in advance by the terminal and the access network device about whether the second indication information indicates the subband or the bandwidth part, and whether the indication is being busy or idle. The agreed method includes communication and direct configuration.

In an example of the present disclosure, the downlink control information may carry one or more second indication information at the same time.

In step 403, the terminal determines the first subband based on the downlink control information, wherein the first subband is an idle subband in the unlicensed spectrum.

In this step, the terminal only needs to decode the second indication information from the downlink control information, and then determine the subband or bandwidth part according to the subband identifier or bandwidth part identifier in the second indication information.

Exemplarily, when the second indication information includes the first subband identifier (that is, indicating an idle subband), the idle subband is directly determined. When the second indication information includes the second subband identifier (that is, the busy subband is indicated), the busy subband is determined first, and then the idle subband can be determined based on all the subbands and the busy subband used by the access network device and the terminals in the unlicensed spectrum.

In an example of the present disclosure, when the bandwidth part is determined according to the second indication information, the subbands included in each bandwidth part are further determined, so as to finally obtain the idle subband. The correspondence between the bandwidth part and the subbands can be configured in the terminal and the access network device, or can be notified to the terminal by the access network device.

In step 404, the terminal performs at least one of control signaling detection and data reception on the first subband.

This step is the same as step 304, and step 304 can be referred to for the detailed process.

Figure 7:
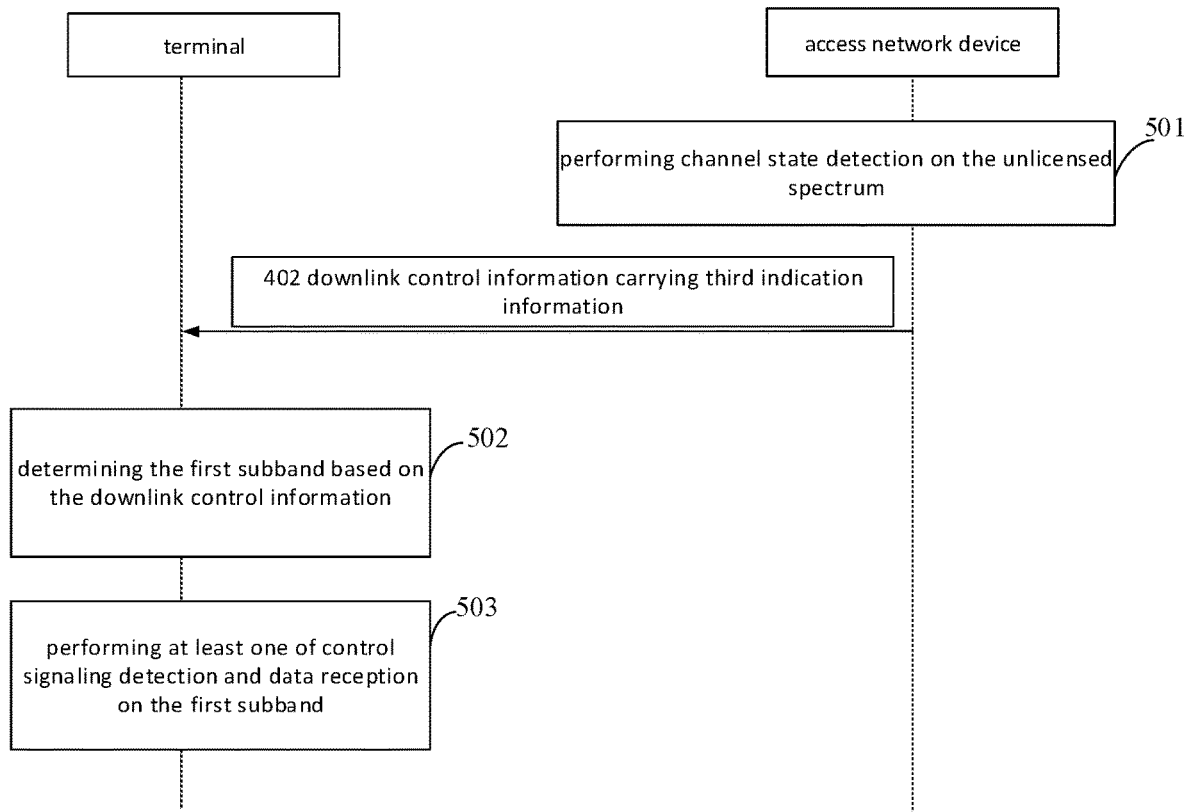
FIG. 7 is a flow chart showing a communication method based on an unlicensed spectrum according to one or more examples of the present disclosure.

FIG. 7 is a flowchart showing a communication method based on an unlicensed spectrum according to an example. Referring to FIG. 7, the method includes the following steps.

In step 501, the access network device performs channel state detection on the unlicensed spectrum.

This step is the same as step 301, and step 301 can be referred to for the detailed process.

In step 502, the access network device sends downlink control information to the terminal. The downlink control information carries third indication information. The third indication information is used to indicate a state set. The state set includes the channel state of one or more subbands, or the state set includes the channel state of one or more bandwidth parts. The channel state of each subband or bandwidth part includes being busy or idle, and each bandwidth part includes one or more subbands.

In an example of the present disclosure, the main difference between step 502 and step 302 is that the downlink control information in step 502 carries third indication information, which indirectly indicates the channel state of each subband or bandwidth part. For example, the third indication information indicates a state set of multiple subbands, so that there is no need to indicate the channel state of each subband, thereby saving data overhead.

In an example of the present disclosure, the third indication information can also be implemented in the following three ways.

As a first type, the third indication information includes the identifier of the state set, and there is a first correspondence between the identifier and the state set.

In the unlicensed spectrum, each subband or bandwidth part includes two states. The two states of all the subbands or bandwidth parts can form a total set. The aforementioned state set is a subset of the total set. Yet, it needs to be noted that, two states of the same subband or bandwidth part will not appear in a subset at the same time.

The following describes the identifier of the state set in conjunction with Table 1. See Table 1 below. When the third indication information includes the identifier of the state set, the identifier of the state set can correspond to the state set which is preset. For example, the identifier of the state set is the identifier 00 of the state set 1. In this case, for the state set 1, the bandwidth parts BWP1 and BWP2 in the state set 1 are idle. As another example, the identifier of the state set 2 is the identifier 01 of the state set 2. In this case, for the state set 2, the bandwidth part BWP3 in the state set 2 is busy, and the bandwidth parts BWP4 and BWP5 are idle, and so on.

TABLE 1

Example of Bandwidth Parts corresponding to Identifiers of State Sets

| Identifiers of State Sets (ID) | State Sets |
|---|---|
| Identifier 00 of State Set 1 | BWP1, BWP2 being idle |
| Identifier 01 of State Set 2 | BWP3 being busy, BWP4 and BWP5 being idle |
| Identifier 10 of State Set 3 | BWP1 being idle |
| Identifier 11 of State Set 4 | BWP3 being idle |

Further, the method may further include: sending, by the access network device, the correspondence (that is, the first correspondence) between the identifier of the state set and the state set to the terminal.

The access network device sends the correspondence between the identifier of the state set and the state set to the terminal in advance, so that the terminal can determine the idle subband or bandwidth part according to the third indication information sent by the access network device.

As a second type, the third indication information includes an orthogonality sequence. The orthogonality sequence is used to indicate the orthogonality in time domain, frequency domain, code domain, or space domain, and there is a second correspondence between the orthogonality sequence and the state set.

In an implementation, the state set is indicated by the orthogonality sequence that is to be carried in the downlink control information itself. The following takes the cyclic redundancy check (CRC) scrambling sequence in the orthogonality sequence in code domain as an example. See Table 2 below. When the third indication information includes the CRC scrambling sequence, the CRC scrambling sequence can correspond to the state set as preset. For example, the CRC scrambling sequence is sequence 1, which corresponds to the state set 1. In the state set 1, the bandwidth parts BWP1 and BWP2 are idle. As another example, the CRC scrambling sequence is sequence 2, which corresponds to the state set 2. The bandwidth parts BWP3 and BWP4 in the state set 2 are idle, etc.

TABLE 2

Examples of Bandwidth Parts corresponding to CRC Scrambling Sequences

| Scrambling Sequences | State Sets |
|---|---|
| Sequence 1 | BWP1 and BWP2 being idle |
| Sequence 2 | BWP3 and BWP4 being idle |
| Sequence 3 | BWP1 and BWP5 being busy |
| Sequence 4 | BWP2 being idle |

Optionally, the method further includes: sending, by the access network device, the correspondence (that is, the second correspondence) between the orthogonality sequence and the state set to the terminal. The access network device sends the correspondence between the orthogonality sequence and the state set to the terminal in advance, so that the terminal can determine the idle subband or bandwidth part according to the indication information sent by the access network device.

As a third type, the third indication information is the time domain transmission position or the frequency domain transmission position of the downlink control information, and there is a third correspondence between the time domain transmission position or the frequency domain transmission position of the downlink control information and the state set.

For example, in time domain, when downlink control information is transmitted on slot1, it corresponds to the first state set. When it is transmitted on slot2, it corresponds to the second state set. The access network device transmits downlink control information on different slots, thereby indicating different state sets of the terminal.

Optionally, the method further includes: sending, by the access network device, the correspondence (that is, the third correspondence) between the time domain transmission position or the frequency domain transmission position of the downlink control information and the state set to the terminal. The access network device sends the correspondence between the time domain transmission position or the frequency domain transmission position of the downlink control information and the state set to the terminal in advance, so that the terminal can determine the idle subband or bandwidth part according to the indication information sent by the access network device.

In an example of the present disclosure, the access network device may send the above-mentioned first correspondence, second correspondence, or third correspondence to the terminal through configuration signaling. For example, the access network device may send the above-mentioned first correspondence, second correspondence or third correspondence to the terminal through various Radio Resource Control (RRC) signaling, Media Access Control Element (MAC CE), or physical layer signaling.

Of course, in addition to notifying the terminal by the access network device of the aforementioned first correspondence, second correspondence, or third correspondence, the aforementioned correspondences may also be directly configured in the terminal and the access network device.

In an example of the present disclosure, the channel states of the subbands in the state set indicated by the third indication information may all be idle. Alternatively, the channel states of the bandwidth parts in the state set indicated by the third indication information may all be idle. In this way, it is convenient for the terminal to quickly determine an idle subband or bandwidth part.

In an example of the present disclosure, the downlink control information may carry one or more third indication information at the same time.

In step 503, the terminal determines a first subband according to the downlink control information, wherein the first subband is an idle subband in the unlicensed spectrum.

In this step, the terminal only needs to decode the third indication information from the downlink control information, and then determine the corresponding state set according to the identifier of the state set or the orthogonality sequence in the third indication information. After that, the idle subbands or bandwidth parts can be determined based on the state set.

The terminal may determine the corresponding state set according to the identifier of the state set in the third indication information, and the correspondence between the identifier of the state set and the state set. Alternatively, the terminal may determine the corresponding state set according to the orthogonality sequence in the third indication information, and the correspondence between the orthogonality sequence and the state set.

For example, when there is an idle subband in the state set indicated by the third indication information, the idle subband is directly determined. When all the subbands in the state set indicated by the third indication information are busy, the busy subbands are determined first, and then the idle subband can be determined based on the total subbands and the busy subbands used by the access network device and the terminals in the unlicensed spectrum.

In an example of the present disclosure, when a bandwidth part is determined according to the third indication information, the subbands included in each bandwidth part are further determined, so as to finally obtain an idle subband. The correspondence between the bandwidth part and the subbands can be configured in the terminal and the access network device, or can be notified to the terminal by the access network device.

In step 504, the terminal performs at least one of detection of control signaling and reception of data on the first subband.

This step is the same as step 304, and step 304 can be referred to for the detailed process.

Figure 8:
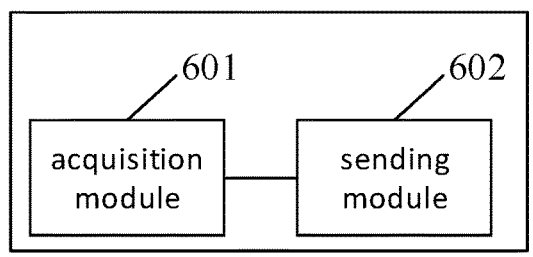
FIG. 8 is a schematic structural diagram showing a communication apparatus based on an unlicensed spectrum according to one or more examples of the present disclosure.

FIG. 8 is a schematic structural diagram showing a communication apparatus based on an unlicensed spectrum according to an example. The apparatus has the function of realizing the access network device in the above method example, and the function can be realized by hardware, or by hardware executing the respective software. As shown in FIG. 8, the apparatus includes: an acquisition module 601 and a sending module 602.

The acquisition module 601 is configured to acquire the channel state detection result of the unlicensed spectrum, wherein the channel state detection result includes whether the subbands or the bandwidth parts in the unlicensed spectrum are busy, and each bandwidth part includes one or more subbands. The sending module 602 is configured to send downlink control information, wherein the downlink control information is used to indicate whether at least part of the subbands or bandwidth parts in the channel state detection result is busy.

Optionally, the downlink control information carries first indication information. The first indication information is used to indicate the channel state of a subband or a bandwidth part, and the channel state of the subband or bandwidth part includes being busy or idle.

Optionally, the first indication information includes a bitmap. Each bit of the bitmap corresponds to a subband, and each bit of the bitmap is used to indicate the channel state of the respective subband. Alternatively, each bit of the bitmap corresponds to a bandwidth part, and each bit of the bitmap is used to indicate the channel state of the respective bandwidth part.

Optionally, the first indication information includes: a subband identifier, and the channel state of the subband corresponding to the subband identifier. Alternatively, the first indication information includes: a bandwidth part identifier, and the channel state of the bandwidth part corresponding to the bandwidth part identifier.

Optionally, the downlink control information carries second indication information. The second indication information is used to indicate the identifier of a first subband or a first bandwidth part, and the channel state of the first subband or the first bandwidth part is being idle. Alternatively, the second indication information is used to indicate the identifier of a second subband or a second bandwidth part, and the channel state of the second subband or the second bandwidth part is being busy.

Optionally, the downlink control information carries third indication information. The third indication information is used to indicate the state set. The state set includes the channel state of one or more subbands, or the state set includes the channel state of one or more bandwidth parts. The channel state of the subband or the bandwidth part includes being busy or idle.

Optionally, the third indication information includes an identifier of the state set, and there is a first correspondence between the identifier and the state set. Alternatively, the third indication information includes an orthogonality sequence, and there is a second correspondence between the orthogonality sequence and the state set. Further alternatively, the third indication information is the time domain transmission position or the frequency domain transmission position of the downlink control information, and there is a third correspondence between the time domain transmission position or the frequency domain transmission position of the downlink control information and the state set.

Optionally, the sending module 602 is further configured to send configuration signaling, wherein the configuration signaling is used to configure the first correspondence, the second correspondence, or the third correspondence.

Optionally, the orthogonality sequence is a scrambling sequence used to scramble CRC of the downlink control signaling.

Optionally, the downlink control information is common downlink control information sent to multiple terminals, or the downlink control information is proprietary downlink control information sent to a single terminal.

Figure 9:
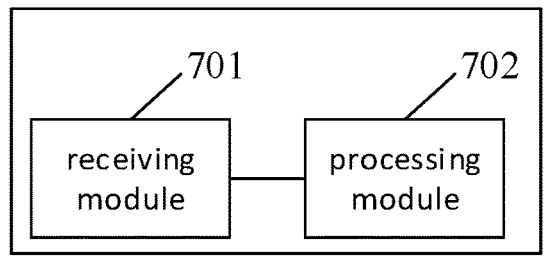
FIG. 9 is a schematic structural diagram showing an access network device according to one or more examples of the present disclosure.

FIG. 9 is a schematic structural diagram showing a communication apparatus based on an unlicensed spectrum according to an example. The apparatus has the function of realizing the terminal in the above method example, and the function can be realized by hardware, or by hardware executing the respective software. As shown in FIG. 9, the apparatus includes: a receiving module 701 and a processing module 702.

The receiving module 701 is configured to receive downlink control information, wherein the downlink control information is used to indicate whether at least part of the subbands or the bandwidth parts in the channel state detection result is busy, and the bandwidth part includes one or more subbands. The processing module 702 is configured to perform at least one of the detection of control signaling and the receiving of data on a first subband, wherein the first subband is an idle subband or a subband in an idle bandwidth part in the unlicensed spectrum.

Optionally, the downlink control information carries first indication information. The first indication information is used to indicate the channel state of a subband or bandwidth part, and the channel state of the subband or bandwidth part includes being busy or idle.

Optionally, the first indication information includes a bitmap. Each bit of the bitmap corresponds to a subband, and each bit of the bitmap is used to indicate the channel state of the respective subband. Alternatively, each bit of the bitmap corresponds to a bandwidth part, and each bit of the bitmap is used to indicate the channel state of the respective bandwidth part.

Optionally, the first indication information includes: a subband identifier, and the channel state of the subband corresponding to the subband identifier. Alternatively, the first indication information includes: a bandwidth part identifier, and the channel state of the bandwidth part corresponding to the bandwidth part identifier.

Optionally, the downlink control information carries second indication information. The second indication information is used to indicate the identifier of a first subband or a first bandwidth part, and the channel state of the first subband or the first bandwidth part is being idle. Alternatively, the second indication information is used to indicate the identifier of a second subband or a second bandwidth part, and the channel state of the second subband or the second bandwidth part is being busy.

Optionally, the downlink control information carries third indication information. The third indication information is used to indicate the state set. The state set includes the channel state of one or more subbands, or the state set includes the channel state of one or more bandwidth parts. The channel state of the subband or the bandwidth part includes being busy or idle.

Optionally, the third indication information includes an identifier of the state set, and there is a first correspondence between the identifier and the state set. Alternatively, the third indication information includes an orthogonality sequence, and there is a second correspondence between the orthogonality sequence and the state set. Further alternatively, the third indication information is the time domain transmission position or the frequency domain transmission position of the downlink control information, and there is a third correspondence between the time domain transmission position or the frequency domain transmission position of the downlink control information and the state set.

Optionally, the receiving module 701 is further configured to receive configuration signaling, wherein the configuration signaling is used to configure the first correspondence, the second correspondence, or the third correspondence.

Optionally, the orthogonality sequence is a scrambling sequence used to scramble CRC of the downlink control signaling.

Figure 10:
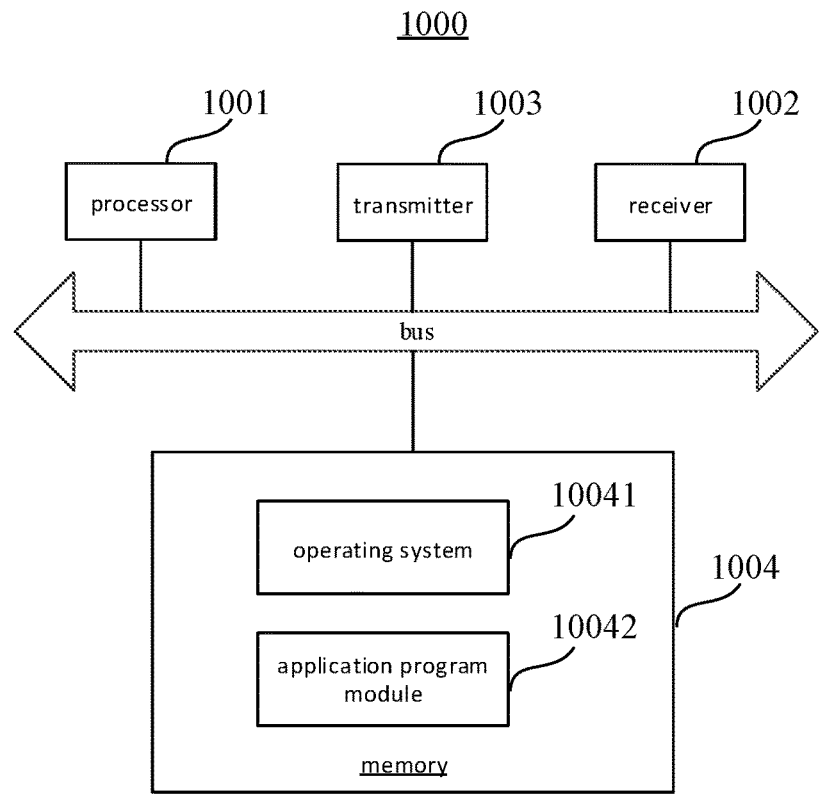
FIG. 10 is a block diagram showing a terminal according to one or more examples of the present disclosure.

FIG. 10 is a block diagram showing an access network device 1000 according to an example. The access network device 1000 may include: a processor 1001, a receiver 1002, a transmitter 1003, and a memory 1004. The receiver 1002, the transmitter 1003, and the memory 1004 are respectively connected to the processor 1001 through a bus.

The processor 1001 includes one or more processing cores. The processor 1001 runs software programs and modules to execute the method executed by the access network device in the communication method based on the unlicensed spectrum provided by an example of the present disclosure. The memory 1004 can be used to store software programs and modules. Specifically, the memory 1004 may store an operating system 10041 and an application program module 10042 required by at least one function. The receiver 1002 is used to receive communication data sent by other devices, and the transmitter 1003 is used to send communication data to other devices.

In an example, a computer-readable storage medium is also provided. The computer-readable storage medium stores at least one instruction, at least one program, code set, or instruction set. The at least one instruction, the at least one program, the code set, or the instruction set is loaded and executed by a processor to implement the communication method based on the unlicensed spectrum provided by the foregoing method examples.

Figure 11:
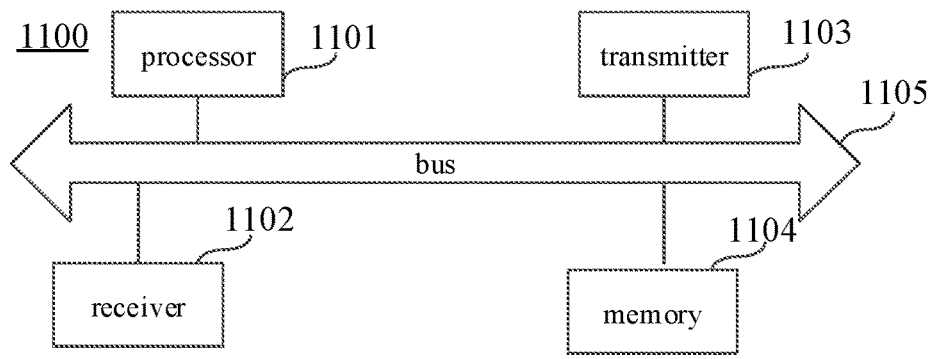
FIG. 11 is a block diagram showing a communication apparatus based on an unlicensed spectrum according to one or more examples of the present disclosure.

FIG. 11 is a block diagram showing a terminal 1100 according to an example. The terminal 1100 may include a processor 1101, a receiver 1102, a transmitter 1103, a memory 1104, and a bus 1105.

The processor 1101 includes one or more processing core. The processor 1101 executes various functional applications and information processing by running software programs and modules.

The receiver 1102 and the transmitter 1103 may be implemented as a single communication component, and the communication component may be a communication chip.

The memory 1104 is connected to the processor 1101 through the bus 1105.

The memory 1104 may be used to store at least one instruction, and the processor 1101 is used to execute the at least one instruction to implement each step in the foregoing method examples.

In addition, the memory 1104 can be implemented by any type of volatile or non-volatile storage device or a combination thereof. The volatile or non-volatile storage device includes, but is not limited to, magnetic disks or optical disks, electrically erasable and programmable read-only memory (EEPROM), erasable programmable read-only memory (EPROM), static anytime access memory (SRAM), read-only memory (ROM), magnetic memory, flash memory, programmable read-only memory (PROM).

In an example, a computer-readable storage medium is also provided. The computer-readable storage medium stores at least one instruction, at least one program, code set, or instruction set. The at least one instruction, the at least one program, the code set, or the instruction set is loaded and executed by a processor to implement the communication method based on the unlicensed spectrum provided by the foregoing method examples.

An example of the present disclosure also provides a communication system based on an unlicensed spectrum. The communication system based on an unlicensed spectrum includes an access network device and a terminal. The access network device is an access network device provided by the example shown in FIG. 10. The terminal is a terminal provided by the example shown in FIG. 11.

According to another aspect of the present disclosure, there is provided a communication apparatus based on an unlicensed spectrum. The apparatus comprises: an acquisition module, configured to acquire a channel state detection result of the unlicensed spectrum, wherein the channel state detection result comprises whether the subbands or bandwidth parts in the unlicensed spectrum are busy, and each bandwidth part includes one or more subbands; and a sending module, configured to send downlink control information, wherein the downlink control information is used to indicate whether each subband or each bandwidth part in at least part of the subbands or bandwidth parts in the channel state detection result is busy.

According to yet another aspect of the present disclosure, there is provided a communication apparatus based on an unlicensed spectrum. The apparatus comprises: a receiving module, configured to receive downlink control information, wherein the downlink control information is used to indicate whether each subband or each bandwidth part in at least part of the subbands or the bandwidth parts in the channel state detection result is busy, and each bandwidth part includes one or more subbands; and a processing module, configured to perform at least one of detection of control signaling and receiving of data on a first subband, wherein the first subband is an idle subband or a subband in an idle bandwidth part in the unlicensed spectrum.

According to another aspect of the present disclosure, there is provided a terminal including: a processor; and a memory for storing processor executable instructions, wherein the processor is configured to load and execute the executable Instructions to implement a communication method based on an unlicensed spectrum as described above.

According to another aspect of the present disclosure, a computer-readable storage medium is provided. When instructions in the computer-readable storage medium are executed by a processor, a communication method based on an unlicensed spectrum as described above can be executed.

Those skilled in the art will easily think of other examples of the present disclosure after considering the specification and practicing the content disclosed herein. The present application is intended to cover any variations, uses, or adaptive changes of the present disclosure. These variations, uses, or adaptive changes follow the general principle of the present disclosure, and include common knowledge or conventional technical means in the technical field that are not disclosed in the present disclosure. The description and examples are to be regarded as exemplary only, and the true scope and spirit of the present disclosure are defined by the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. A communication method based on unlicensed spectrum, comprising:
    acquiring a channel state detection result of the unlicensed spectrum, wherein the channel state detection result comprises whether subbands or bandwidth parts in the unlicensed spectrum are busy, and each bandwidth part comprises one or more subbands; and
    sending downlink control information, wherein the downlink control information indicates at least one subband in the channel state detection result is busy or not, or indicates at least one bandwidth part in the channel state detection result is busy or not,
    wherein the downlink control information comprises second indication information, wherein
    the second indication information indicates an identifier of a first subband or a first bandwidth part, and a channel state of the first subband or the first bandwidth part is being idle; or
    the second indication information indicates an identifier of a second subband or a second bandwidth part, and a channel state of the second subband or the second bandwidth part is being busy.

2. The method according to claim 1, wherein the downlink control information comprises first indication information, wherein
    the first indication information indicates a channel state of a subband or a bandwidth part, and the channel state of the subband or the bandwidth part comprises being busy or idle.

3. The method according to claim 2, wherein the first indication information comprises a bitmap, wherein
    each bit of the bitmap corresponds to a subband, and each bit of the bitmap indicates a channel state of a respective subband; or
    each bit of the bitmap corresponds to a bandwidth part, and each bit of the bitmap indicates a channel state of a respective bandwidth part.

4. The method according to claim 2, wherein
    the first indication information comprises: a subband identifier, and a channel state of a subband corresponding to the subband identifier; or
    the first indication information comprises: a bandwidth part identifier, and a channel state of a bandwidth part corresponding to the bandwidth part identifier.

5. The method according to claim 1, wherein the downlink control information comprises third indication information, wherein
    the third indication information indicates a state set;

the state set comprises a channel state of one or more subbands, or the state set comprises a channel state of one or more bandwidth parts; and
the channel state of each subband or each bandwidth part comprises being busy or idle.

6. The method according to claim 5, wherein
the third indication information comprises an identifier of the state set, and a first correspondence exists between the identifier and the state set; or
the third indication information comprises an orthogonality sequence, and a second correspondence exists between the orthogonality sequence and the state set; or
the third indication information comprises a time domain transmission position or a frequency domain transmission position of the downlink control information, and a third correspondence exists between the time domain transmission position or the frequency domain transmission position of the downlink control information and the state set.

7. The method according to claim 6, wherein the method further comprises:
sending configuration signaling, wherein the configuration signaling configures the first correspondence, the second correspondence, or the third correspondence.

8. The method according to claim 6, wherein the orthogonality sequence is a scrambling sequence configured to scramble Cyclic Redundancy Check (CRC) of the downlink control signaling.

9. The method according to claim 1, wherein the downlink control information comprises common downlink control information sent to multiple terminals, or the downlink control information comprises proprietary downlink control information sent to a single terminal.

10. A communication method based on unlicensed spectrum, comprising:
receiving downlink control information, wherein the downlink control information indicates at least one subband in the channel state detection result is busy or not, or indicates at least one bandwidth part in the channel state detection result is busy or not, and each bandwidth part comprises one or more subbands; and
performing at least one of detection of control signaling and receiving of data on a first subband, wherein the first subband is an idle subband or a subband in an idle bandwidth part in the unlicensed spectrum,
wherein the downlink control information comprises second indication information, wherein
the second indication information indicates an identifier of a first subband or a first bandwidth part, and a channel state of the first subband or the first bandwidth part is being idle; or
the second indication information indicates an identifier of a second subband or a second bandwidth part, and a channel state of the second subband or the second bandwidth part is being busy.

11. The method according to claim 10, wherein the downlink control information comprises first indication information, wherein
the first indication information indicates a channel state of a subband or a bandwidth part, and the channel state of the subband or the bandwidth part comprises being busy or idle.

12. The method according to claim 11, wherein the first indication information comprises a bitmap, wherein
each bit of the bitmap corresponds to a subband, and each bit of the bitmap indicates a channel state of a respective subband; or
each bit of the bitmap corresponds to a bandwidth part, and each bit of the bitmap indicates a channel state of a respective bandwidth part.

13. The method according to claim 11, wherein
the first indication information comprises: a subband identifier, and a channel state of a subband corresponding to the subband identifier; or
the first indication information comprises: a bandwidth part identifier, and a channel state of a bandwidth part corresponding to the bandwidth part identifier.

14. The method according to claim 10, wherein the downlink control information comprises third indication information, wherein
the third indication information indicates a state set;
the state set comprises a channel state of one or more subbands, or the state set comprises a channel state of one or more bandwidth parts; and
the channel state of each subband or each bandwidth part comprises being busy or idle.

15. The method according to claim 14, wherein
the third indication information comprises an identifier of the state set, and a first correspondence exists between the identifier and the state set; or
the third indication information comprises an orthogonality sequence, and a second correspondence exists between the orthogonality sequence and the state set; or
the third indication information comprises a time domain transmission position or a frequency domain transmission position of the downlink control information, and a third correspondence exists between the time domain transmission position or the frequency domain transmission position of the downlink control information and the state set.

16. The method according to claim 15, wherein the method further comprises:
receiving configuration signaling, wherein the configuration signaling configures the first correspondence, the second correspondence, or the third correspondence.

17. The method according to claim 15, wherein the orthogonality sequence is a scrambling sequence used to scramble CRC of the downlink control signaling.

18. An access network device, wherein the access network device comprises:
a processor; and
a memory, configured to store processor executable instructions, wherein
the processor is configured to load and execute the executable instructions to implement a communication method, comprising:
acquiring a channel state detection result of the unlicensed spectrum, wherein the channel state detection result comprises whether subbands or bandwidth parts in the unlicensed spectrum are busy, and each bandwidth part comprises one or more subbands; and
sending downlink control information, wherein the downlink control information indicates at least one subband in the channel state detection result is busy or not, or indicates at least one bandwidth part in the channel state detection result is busy or not,
wherein the downlink control information comprises second indication information, wherein
the second indication information indicates an identifier of a first subband or a first bandwidth part, and a channel state of the first subband or the first bandwidth part is being idle; or
the second indication information indicates an identifier of a second subband or a second bandwidth part, and a channel state of the second subband or the second bandwidth part is being busy.

\* \* \* \* \*